United States Patent [19]

Kohayakawa

[11] Patent Number: 4,826,315
[45] Date of Patent: May 2, 1989

[54] LENS METER

[75] Inventor: Yoshimi Kohayakawa, Yokohama, Japan

[73] Assignee: Canon Kabushiki Kaisha, Tokyo, Japan

[21] Appl. No.: 870,976

[22] Filed: Jun. 5, 1986

[30] Foreign Application Priority Data

Jun. 14, 1985 [JP] Japan ................. 60-129398
Mar. 25, 1986 [JP] Japan ................. 61-67680

[51] Int. Cl.⁴ .............................................. G01B 9/00
[52] U.S. Cl. .................................................... 356/125
[58] Field of Search ............... 356/124, 125, 126, 127; 351/124, 125, 126, 127

[56] References Cited

U.S. PATENT DOCUMENTS

| | | | |
|---|---|---|---|
| 3,880,525 | 4/1975 | Johnson | 356/127 |
| 4,275,964 | 6/1981 | Vassiliadis | 356/127 |
| 4,641,961 | 2/1957 | Yamada | 356/127 |

FOREIGN PATENT DOCUMENTS 56-161031 12/1981 Japan.
60-143737 7/1985 Japan.

*Primary Examiner*—Richard A. Rosenberger
*Attorney, Agent, or Firm*—Fitzpatrick, Cella, Harper & Scinto

[57] ABSTRACT

A lens meter has a single point-like light source, a collimator lens for collimating the light from the point-like light source and causes it to enter a lens to be examined, a plural-aperature stop disposed immediately rearwardly of the lens to be examined and having three or more apertures, a light-receiving optical system including a prism assembly for separating the light beams from the plural-aperture stop on the light-receiving surface thereof, and an array light-receiving element disposed at the focus position of the light-receiving optical system for measuring the refractive value of the lens to be examined by the mutual positional relation between the received light beams.

4 Claims, 3 Drawing Sheets

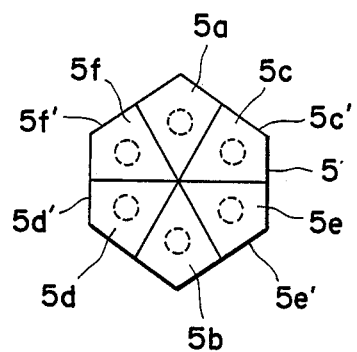
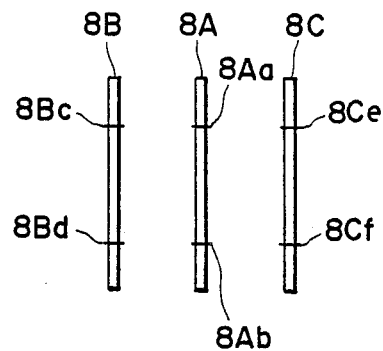
FIG. 6　　　FIG. 7
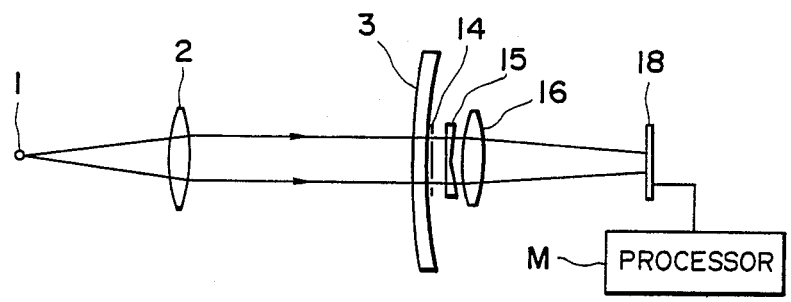
FIG. 8

4,826,315

LENS METER

BACKGROUND OF THE INVENTION

1. Field of the Invention

This invention relates to a lens meter used in ophthalmic hospitals, by opticians, etc., to measure the refractive value, i.e., the degree of spherical refraction, the degree of astigmatic refraction, the astigmatic angle and the degree of prism, of lenses for spectacles.

2. Related Background Art

The conventional lens meters are generally designated such that the image of a chart illuminated by a light source is formed by an auxiliary lens. The image of the chart is observed by means of a telescope adjusted to infinity through a lens to be examined. The chart is moved in the direction of the optic axis so as to enable the image of the chart to be clearly seen, and at that point of time, the position of the chart graduated in diopter is read to thereby obtain the measured value of the refractive power.

Recently, use has been made of automatic measuring lens meters of the type in which the measured value is obtained by depressing a button after manual adjustment of the lens meters. However, like popular lens meters, such lens meters are complex because of the presence of mechanically movable portions.

SUMMARY OF THE INVENTION

It is an object of the present invention to provide a lens meter which has no movable parts and is simple in construction.

It is also an object of the present invention to provide an inexpensive lens meter which adopts a single point-like source as a measuring light source.

BRIEF DESCRIPTION OF THE DRAWINGS

FIG. 6 is a front view of a meridian rotating and deflecting prism.

FIG. 7 shows distribution of slit images on three linear photosensor arrays in a second embodiment of the present invention.

FIG. 8 shows an optical arrangement of a third embodiment of the present invention.

DESCRIPTION OF THE PREFERRED EMBODIMENTS

Figure 1:
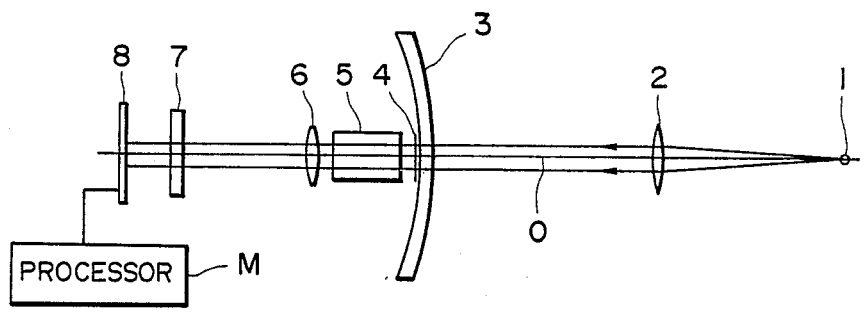
FIG. 1 shows an optical arrangement of a first embodiment of the present invention.

Referring to FIG. 1 which shows an optical arrangement of a first embodiment of the present invention, there are disposed on an optic axis of a point-like light source 1 comprising a light-emitting diode, in succession from the light source 1 side, a convex lens 2 as a collimator lens, a lens 3 to be examined, a 6-aperture stop 4, a prism 5, a convex lens 6, a cylindrical concave lens 7 and a linear photosensor array 8 such as a CCD. The light source 1 is provided at the focus position of the convex lens 2, and the 6-aperture stop 4 is disposed in proximity to the rear surface of the lens 3 to be examined. The sensor array 8 is provided at the focus position of the convex lens 6. The cylindrical concave lens 7 whose generator is in the direction of array arrangement of the sensor array 8 expands light in a direction perpendicular to the direction of arrangement of the sensor array 8 and ensures that the light beam impinges on the sensor array even if the light beam moves in the direction perpendicular to the direction of arrangement of the sensor array 8.

Figure 2:
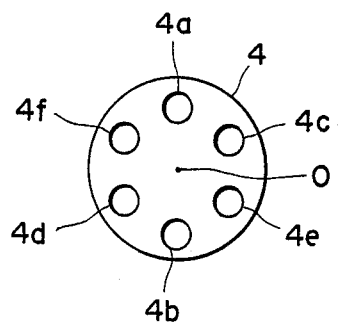
FIG. 2 is a front view of a 6-aperture stop.

Accordingly, the light beam emitted from the light source 1 is collimated by the convex lens 2 and enters the lens 3 to be examined, and the light beam refracted in conformity with the refractive powers of various portions of the lens 3 to be examined enters the 6-aperture stop 4. Referring to FIG. 2 which is a plan view of the 6-aperture stop 4, this 6-aperture stop 4 has six openings 4a, 4b, 4c, 4d, 4e and 4f each provided at an angle of 60°. The light beam having emerged from the lens 3 to be examined is made into six light beams by the 6-aperture stop 4, and these light beams enter the prism 5 which deflects the light beams so as to be separated on the light-receiving surface. At this time, the light beams enter the prism 5 with an iclination corresponding to the refractive power of the lens 3 to be examined.

Figure 3:
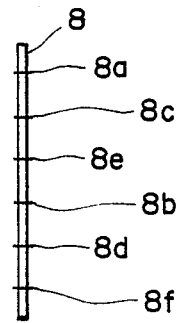
FIG. 3 shows the distribution of slit images on a linear photosensor array.

Now, when the lens 3 to be examined is removed and a parallel light beam enters the 6-aperture stop 4, the light beams having emerged from the 6-aperture stop 4 will be imaged on concentric circles corresponding to the openings in the 6-aperture stop 4 if received by a two-dimensional surface. The following is done to cause these light beams to move on a one-dimensional light-receiving line parallel to a segment 4a–4b passing through the openings 4a and 4b in the 6-aperture stop 4. The light beams passing through the openings 4c and 4d disposed with an inclination of 60° with respect to the openings 4a and 4b are rotated counter-clockwise by 60° and displaced downwardly by $\frac{1}{3}$ of the distance between images 8a and 8b, and the light beams passed through the openings 4e and 4f are rotated clockwise by 60° and displaced downwardly by $\frac{2}{3}$ of the distance between images 8a and 8b, whereby on the linear photosensor array 8 which is the light-receiving surface, there are obtained, in succession from above, images 8a, 8c, 8e, 8b, 8d and 8f corresponding to the equidistantly disposed openings 4a, 4c, 4e, 4b, 4d and 4f, as shown in FIG. 3.

Thus, when the same operation as the operation effected when the lens 3 to be examined was absent is applied to the light beams refracted by the lens 3 to be examined and passed through the 6-aperture stop 4, there are obtained on the linear photosensor array 8 images corresponding to the openings 4a, 4c, 4e, 4b, 4d and 4f at intervals corresponding to the refractive power of the lens 3 to be examined. The refractive power in each meridian direction can be found from these image intervals by the use of operation means M.

In the description of the case where the lens 3 to be examined is absent, the image intervals on the sensor array 8 have been described as being equal, whereas the image intervals need not always be equal, but by making the amount of deflection of the light beam small, for example, within a range in which no hindrance occurs to the measurement of the distance between images, the length of the sensor array 8 can be shortened to a certain degree.

Figure 4:
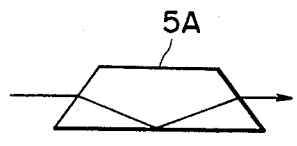
FIG. 4 illustrates the state of a light beam passing through an image rotating prism.

The prism 5 is used to rotate and deflect the light beams thus passed through the 6-aperture stop 4. FIG. 4 illustrates the meridian rotating function of this prism 5, and it is a view in which a trapezoidal prism 5A is disposed so that the trapezoidal portion thereof is seen in the plane of the drawing sheet. Seeing the incident light ray onto and the emergent light ray from the trapezoidal prism 5A from this direction, the image on the bottom surface is inverted in the plane of the drawing sheet, while inversion of the image does not occur in a plane perpendicular to the plane of the drawing sheet. If the prism 5A is rotated, e.g., by 90° about the optic axis of FIG. 5 and disposed so that the rectangular portion of the bottom surface thereof is seen in the plane of the drawing sheet, the direction of the image does not change in the plane of the drawing sheet but is inverted in the plane perpendicular to the plane of the drawing sheet and thus, the image is rotated by 180°. When the trapezoidal prism 5A is thus rotated about the optic axis, the image is rotated about the same axis twice the angle of rotation of the prism.

In the present embodiment, the sensor array 8 is disposed in the direction of the openings 4a–4b and the meridian direction 4c–4d has an angle of 60° with respect thereto and therefore, if the prism 5A is disposed in the light beam from the opening 4c and is rotated by 30° about the center line of the light beam, the inclination in the direction of the openings 4c–4d, can be changed into the direction of the openings 4a–4b, i.e., the direction of the sensor array 8. Accordingly, by endowing the prism 5 with the structure of the prism 5A and rotating it by 30° about the optic axis, the prism 5 can be made to perform the meridian rotating function.

For the light beams passed through the other openings 4d, 4e and 4f, the meridian can likewise be rotated by the prism 5 having the structure of the prism 5A and these light beams can be imaged on the sensor array 8.

Figure 5:
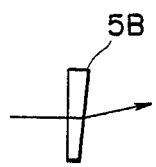
FIG. 5 illustrates the deflection by a deflecting prism.

FIG. 5 illustrates the deflecting function of the prism 5, and shows that by a wedge prism 5B being disposed in the light beam, the light beam is refracted and deflected. Accordingly, by endowing the prism 5 with a structure equal to the structure in which the wedge prism 5B is disposed in the light beams passed through each of the openings 4a–4f and suitably selecting the inclination of exit surface of each prism 5B, the light beams can be deflected so as to be imaged at a certain interval on the sensor array 8.

FIG. 6 is a cross-sectional view of a prism 5 comprising six small prisms having the structure of the trapezoidal prism 5A shown in FIG. 4 as well as the structure of the wedge prism 5B shown in FIG. 5. The light beams from openings 4a, 4b, 4c, 4d, 4e and 4f may pass through the respective small prisms 5a, 5b, 5c, 5d, 5e and 5f, and the light beams in the small prisms 5c, 5d, 5e and 5f may be totally reflected by respective surfaces 5c', 5d', 5e' and 5f' and meridian rotation thereof may be accomplished thereby. The entrance and exit surfaces of the small prisms 5a–5f are formed into suitably inclined surface so that light beams may be imaged at reference intervals on the sensor array 8 when the lens 3 to be examined is removed so that a parallel light beam may enter the 6-aperture stop 4. The prism 5 can be integrally made in a mold.

In this manner, the light beams passing through the openings 4a–4f in the 6-aperture stop 4 can be imaged on the sensor array 8 through the prism 5, the convex lens 6 and the cylindrical concave lens 7. Since the sensor array 8 is provided at the focus position of the convex lens 6, the positions of the light beams on the sensor array 8 are displaced in proportion to the inclination of the light beam in a plane containing the center of each opening 4a–4f and the optic axis O with respect to the optic axis O. Accordingly, by measuring the position of each imaging point on the sensor array 8, the inclination of the light beam in each meridian direction, i.e., the refractive power in each meridian direction, can be known.

Now, the variation in the refractive power of a lens having astigmatism in the meridian direction is sine-wave-like and therefore, if the refractive powers in three meridian directions are known, the refractive power in the other directions can all be found by calculation. Accordingly, if the refractive powers in three meridian directions are found from the intervals between the images 8a–8b, 8c–8d and 8e–8f on the sensor array 8, the refractive power of the lens 3 to be examined in each meridian direction can be found.

Also, considering, for example, the direction of the openings 4a–4b, the two light beams passed through the openings 4a and 4b are dispersed by an equal amount and therefore, the degree of prism can be found as the average value of the deviations of the images 8a and 8b from a predetermined position. The other directions can also be found from the corresponding image positions in a similar manner. As regards the degree of prism, if two directions are known, the other directions can be found by calculation. Also, in a case where the lens 3 to be examined is eccentrically placed, an influence similar to that in the case where there is the degree of prism is imparted to the light beam.

FIG. 7 shows a state in which the light beams on three linear photosensor array 8A, 8B and 8C are imaged according to a second embodiment of the present invention. Images 8Aa and 8Ab are formed by light beams passed through openings 4a and 4b, respectively, and likewise, images 8Bc, 8Bd, 8Ce, and 8Cf are formed by light beams passed through openings 4c, 4d, 4e and 4f, respectively.

The second embodiment is the same as the first embodiment except the prism 5, the cylindrical concave lens 7 and the sensor arrays 8. Three sensor array 8A, 8B and 8C are disposed instead of the sensor array 8, and corresponding to the sensor arrays 8A, 8B and 8C, cylindrical concave lenses 7a, 7b and 7c, not shown, are provided instead of the cylindrical concave lens 7. A prism 5', not shown, in which the angles of inclination of the entrance and exit surfaces of the prism 5 are adjusted is disposed so that light beams passed through openings 4a–4b, 4c–4d and 4e–4f may be imaged on the three sensor arrays 8A, 8B and 8C, respectively.

As in the first embodiment, if the refractive power and the degree of prism of the lens 3 to be examined change, the images 8Aa, 8Ab, 8Bc, 8Bd, 8Ce and 8Cf on the respective sensor arrays 8A, 8B and 8C move in the directions of array arrangements in response thereto and therefore, by measuring the amounts of movement thereof, the refractive power and the degree of prism of the lens 3 to be examined can be known. In this case, there is a disadvantage that the number of the sensor arrays 8 and the number of the cylindrical concave lenses 7 must be increased as compared with the first embodiment, but there is an advantage that the amounts of movement of the images on the sensor arrays 8A–8C are easy to see and easy to measure.

Figures 9, 10:
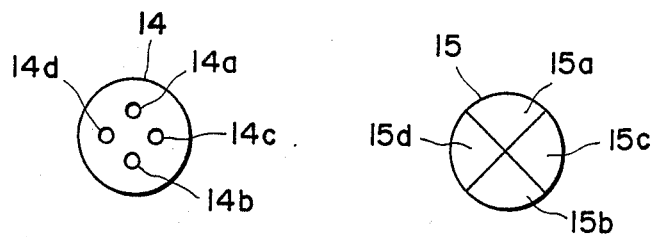
FIG. 9 is a front view of a plural-aperture stop.
FIG. 10 is a front view of a prism assembly.

Still another embodiment of the present invention will now be described with reference to FIG. 8. In FIG. 8, there are disposed, along a light beam emitted from a point-like light source 1, a collimator lens 2, a plural-aperture stop 14, a prism assembly 15 comprising a plurality of wedge prisms for deflecting light beams separated by the plural-aperture stop 14, a light-receiving optical system 16 for receiving the light beams deflected by the prism assembly 15, and a two-dimensional array sensor light-receiving element 18 such as a CCD (charge coupled device) dispersed at the focus position of the light-receiving optical system 16. A lens 3 to be examined is inserted between the collimator lens 2 and the plural-aperture stop 14. The number of the apertures of the plural-aperture stop 14 may be three or more, and in the present embodiment, the plural-aperture stop 14 has four apertures 14a–14d as shown in FIG. 9, and the prism assembly 15 is comprised of four wedge prisms 15a–15d as shown in FIG. 10.

In FIG. 8, the light beam from the point-like light source 1 is collimated by the collimator lens 2 and then enters the lens 3 to be examined, and the light beam passed through the lens 3 to be examined is separated into four light beams through the four apertures 14a–14d of the plural-aperture stop 14, and those light beams are deflected by the prisms 15a–15d, respectively, of the prism assembly 15, pass through the light-receiving optical system 16 and are received by the array sensor light-receiving element 18 such as a CCD disposed on the focal plane of the light-receiving optical system 16.

Figure 11:
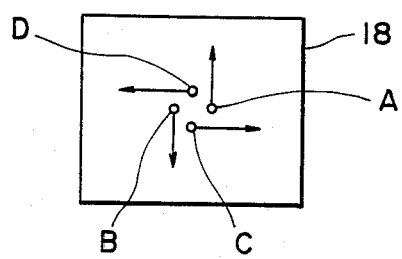
FIG. 11 illustrates positions of light beams on an array sensor light-receiving element and directions of movement thereof.

FIG. 11 shows the positions of four light beams A–D received on the array sensor light-receiving element 18, and arrows indicate the directions in which the light beams A–D move by the focal length of the lens 3 to be examined. Where there is a degree of astigmatism in the lens 3 to be examined, the positions of the light beams on the array sensor light-receiving element 18 become deviated from the directions of arrows in FIG. 11. Also, if the lens 3 to be examined becomes eccentric relative to the optic axis of the apparatus, the positions of the light beams will generally move.

To measure the refractive value, i. e., the degree of spherical refraction, the number of astigmatic refraction and the astigmatic angle, of the lens 3 to be examined from the position of the light beams on the array sensor light-receiving element 18, five unknown quantities in addition to two unknown quantities of eccentricity can be found by calculation if the two-dimensional positions of a minimum of three light beams are known.

Figures 12, 13:
FIG. 12 is an enlarged view of a light beam.
FIG. 13 shows the wave forms of the binary signals of the light beams.

To find the position of the light beams on the array sensor light-receiving element 18, for example, the level may be determined and binarized and the central position of the light beams may be calculated from that position. For example, FIG. 12 is an enlarged view of the light beam A, and signals may be read out along the arrangement of elements concerned therewith and the level may be determined and the signals may be made into such a binary signals as shown in FIG. 13, and the positions thereof may once be stored in a memory, whereby the center of the light beam may be calculated.

In FIG. 8, the prism assembly 15 functions to separate the light beams on the array sensor light-receiving element 18 and, if this prism assembly 15 is absent, when the lens 3 to be examined is not inserted, the light beams passing through the apertures 14a–14d of the plural-aperture stop 14 will converge at a point on the array sensor light-receiving element 18. If the light beams are only separated from one another, it will be possible to find the individual coordinates of the light beams, and as long as the light beams are separated from one another, the directions of the wedges of the prism assembly 15 can be freely selected.

What I claim is:

1. A lens meter having:
a single point-like light source;
a collimator lens for collimating the light from said light source and causing it to enter a lens to be examined;
a plural-aperture stop for producing light beams, said plural-aperture stop being disposed immediately behind said lens to be examined and having plural apertures;
a light-receiving optical system for transmitting the light beams from said plural-aperture stop to a light-receiving surface located at a focus position of said light receiving optical system, said light-receiving optical system including a fixed prism assembly to rotate and deflect the light beams from said plural-aperture stop so as to separate the light beams from each other on the light-receiving surface thereof; and
a predetermined number of arrays of light-receiving elements disposed at the focus position of said light-receiving optical system for measuring the refractive value of said lens to be examined by the mutual positional relation between the received light beams.

2. A lens meter according to claim 1, wherein said stop is provided with apertures extending at least in direction of three meridians around the optical axis of said collimator lens.

3. A lens meter according to claim 2, including a plurality of one-dimensional arrays of light-receiving elements provided in parallel with one another.

4. A lens meter according to claim 2, wherein only a single one-dimensional array of light-receiving elements is disposed in a predetermined direction.

* * * * *